United States Patent
Koscielski et al.

(10) Patent No.: US 10,092,973 B2
(45) Date of Patent: Oct. 9, 2018

(54) WELDER WITH INDIRECT SENSING OF WELD FASTENER POSITION

(71) Applicant: Doben Limited, Windsor (CA)

(72) Inventors: Larry Koscielski, LaSalle (CA); Simon Britton, Windsor (CA); Matt Branoff, Lasalle (CA)

(73) Assignee: DOBEN LIMITED, Windsor (CA)

( * ) Notice: Subject to any disclaimer, the term of this patent is extended or adjusted under 35 U.S.C. 154(b) by 0 days.

(21) Appl. No.: 14/777,826

(22) PCT Filed: Sep. 18, 2014

(86) PCT No.: PCT/CA2014/050896
§ 371 (c)(1),
(2) Date: Sep. 17, 2015

(87) PCT Pub. No.: WO2016/041052
PCT Pub. Date: Mar. 24, 2016

(65) Prior Publication Data
US 2017/0239747 A1 Aug. 24, 2017

(51) Int. Cl.
*B23K 11/25* (2006.01)
*B23K 11/31* (2006.01)
*B23K 11/00* (2006.01)

(52) U.S. Cl.
CPC ........ *B23K 11/253* (2013.01); *B23K 11/0053* (2013.01); *B23K 11/315* (2013.01)

(58) Field of Classification Search
CPC .. B23K 11/253; B23K 11/0053; B23K 11/315
See application file for complete search history.

(56) References Cited

U.S. PATENT DOCUMENTS

| | | | |
|---|---|---|---|
| 4,296,304 A | * | 10/1981 | Defourny ............. B23K 11/253 219/86.41 |
| 7,564,005 B2 | | 7/2009 | Cabanaw et al. |
| 2003/0010758 A1 | | 1/2003 | Cabanaw |
| 2003/0213779 A1 | | 11/2003 | Hidaka |

(Continued)

FOREIGN PATENT DOCUMENTS

| | | |
|---|---|---|
| CN | 103071904 | 5/2013 |
| CN | 203091957 | 7/2013 |
| CN | 103722286 | 4/2014 |

(Continued)

OTHER PUBLICATIONS

Machine translation of Japan Patent No. 9-295,162, Feb. 2018.*

(Continued)

*Primary Examiner* — Geoffrey S Evans
(74) *Attorney, Agent, or Firm* — Carlson, Gaskey & Olds, P.C.

(57) ABSTRACT

An upper electrode assembly for welding fasteners includes a body that supports an electrode that has an aperture. The aperture is configured to receive a movable pin of a lower electrode assembly arranged opposite the upper electrode assembly. The lower electrode assembly supports a fastener in a welding position. The upper electrode assembly includes a position sensor which includes a position sensor member that is arranged in the body and is configured to cooperate with the pin to detect a fastener welding characteristic.

21 Claims, 4 Drawing Sheets

(56) References Cited

U.S. PATENT DOCUMENTS

2005/0150874 A1    7/2005   Cabanaw et al.
2010/0264125 A1   10/2010   Hidaka

FOREIGN PATENT DOCUMENTS

| JP | H06238460 | 8/1994 |
| JP | H06246460 | 9/1994 |
| JP | H0910956 | 1/1997 |
| JP | 09-295162 A * | 11/1997 |
| JP | H09295162 | 11/1997 |
| WO | 03006199 | 1/2003 |

OTHER PUBLICATIONS

European Search Report for European Application No. 14885840.0 dated Jul. 29, 2016.
International Search Report and Written Opinion for PCT/CA2014/050896 dated Dec. 4, 2014.

* cited by examiner

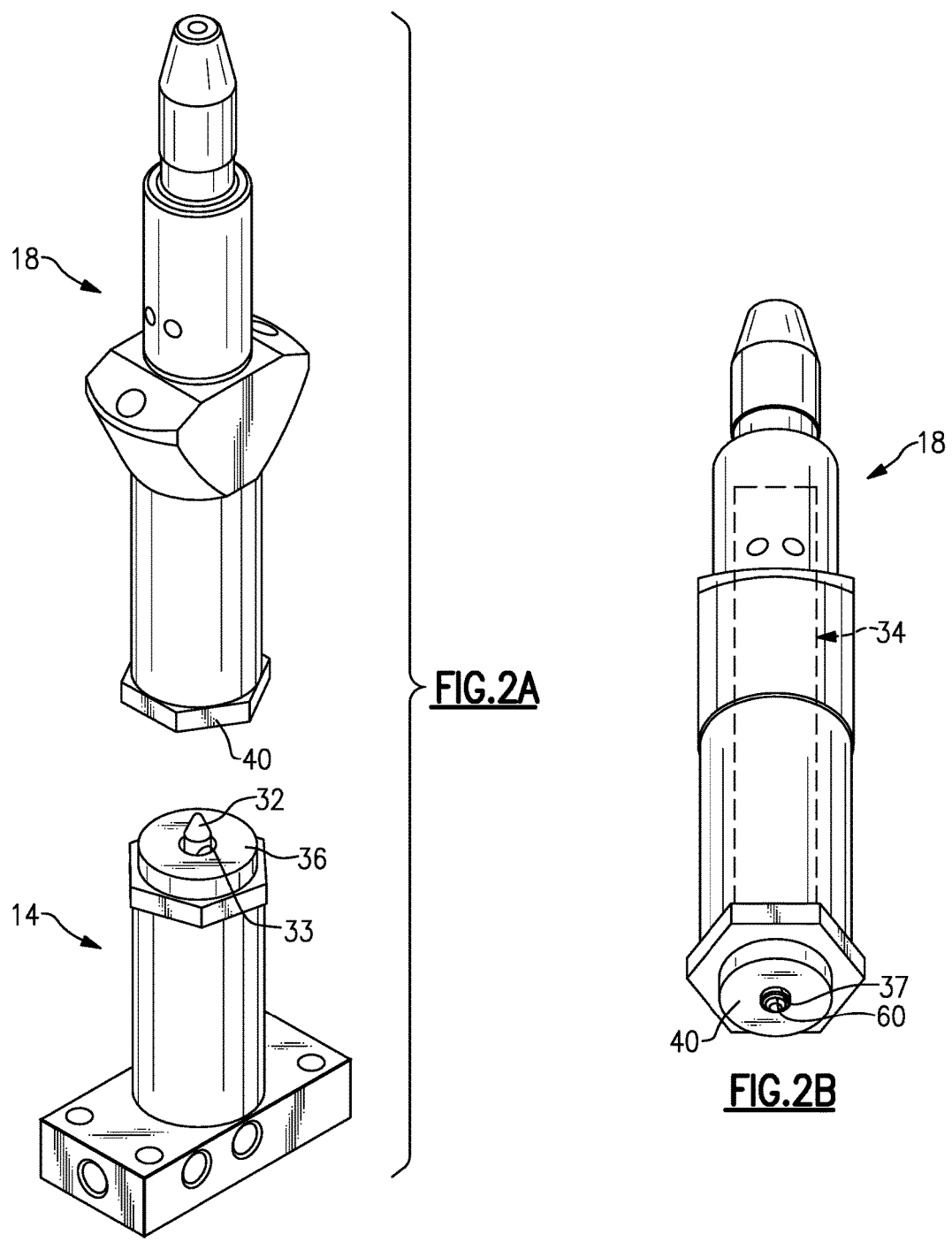

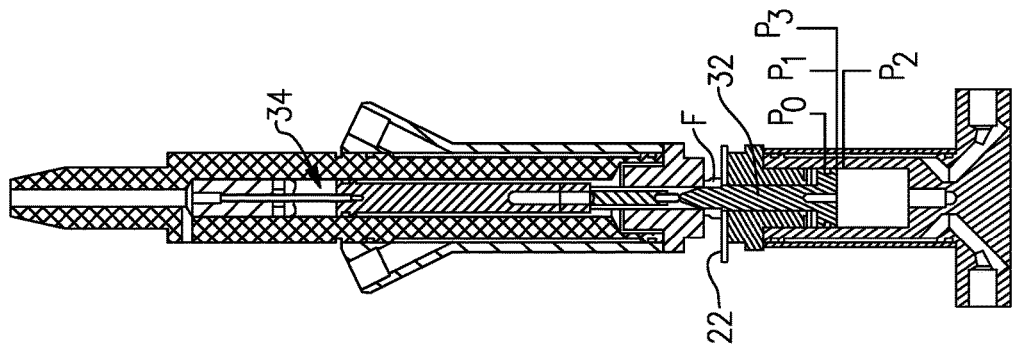
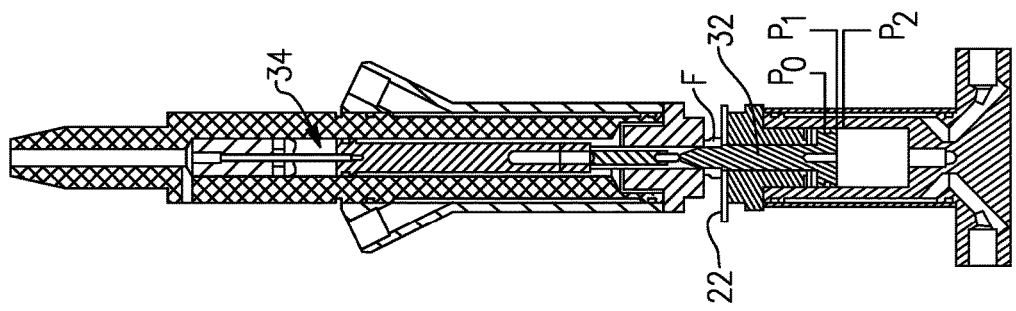
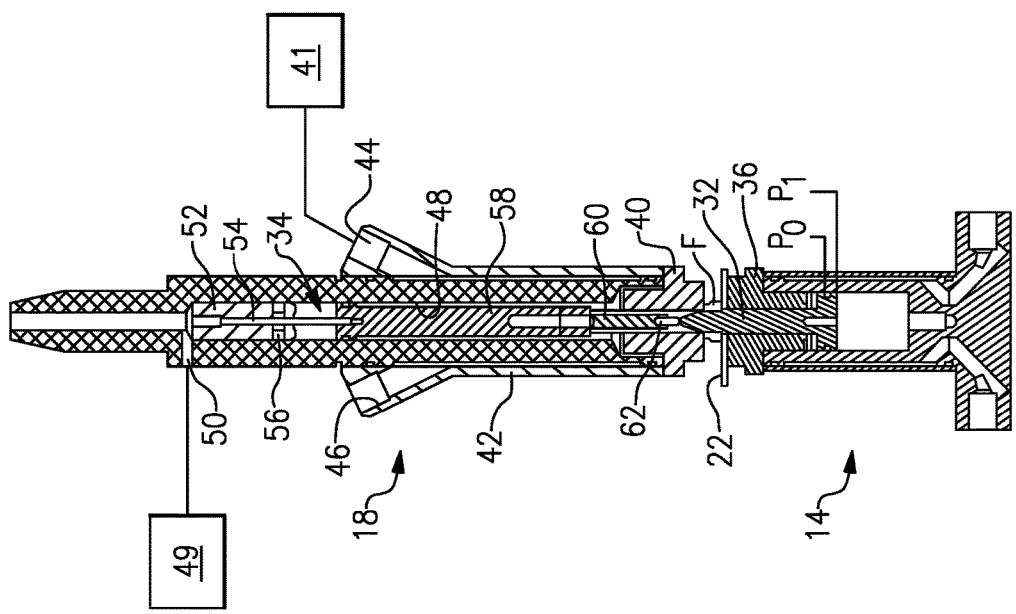

WELDER WITH INDIRECT SENSING OF WELD FASTENER POSITION

BACKGROUND

This disclosure relates to a weld gun for resistance welding metal components, such as fasteners, to a metallic object, such as sheet metal. More particularly, this disclosure relates an electrode assembly for indirect sensing of fastener position.

Weld gun assemblies are used to resistance weld fasteners to metallic objects such as body panels for vehicles. A fastener, such as a weld stud or nut, is loaded onto one of the electrodes. The electrodes are moved together with an actuator thereby placing the fastener into engagement with the panel under pressure. Very high currents are applied to the electrodes, which welds the fastener to the panel.

The use of weld guns is typically an automated process in which the fasteners are loaded into the weld gun assembly. Occasionally, the fastener is not properly loaded into the weld gun or the fastener may not be loaded into the weld gun at all. Under these circumstances, it is important to detect that there is a problem with the fastener so that the fastener can be properly welded to the panel. To this end, sensors have been used in an effort to determine the presence and orientation of the fastener in the weld gun. Typically, a linear variable displacement transducer (LVDT) has been connected to an electrode arm to measure the movement of the arm. If no nut is present, then the arm will move a greater amount than if a fastener is present and in the proper orientation. If the fastener is not in the proper orientation, then the electrode arm will move slightly less than if the fastener is in the proper orientation. In this manner, fastener presence and orientation has been detected. However, it has been difficult to accurately detect the proper orientation of the fastener for several reasons.

SUMMARY

In one exemplary embodiment, an upper electrode assembly for welding fasteners includes a body that supports an electrode that has an aperture. The aperture is configured to receive a movable pin of a lower electrode assembly arranged opposite the upper electrode assembly. The lower electrode assembly supports a fastener in a welding position. The upper electrode assembly includes a position sensor which includes a position sensor member that is arranged in the body and is configured to cooperate with the pin to detect a fastener welding characteristic.

In a further embodiment of the above, the position sensor has a linear variable displacement transducer (LVDT).

In a further embodiment of any of the above, the body includes a bore. The position sensor includes a piston that is slidably received in the bore. The LVDT has a LVDT core that is secured to one side of the piston.

In a further embodiment of any of the above, the position sensor member includes a probe that is slidably received in the aperture and is secured to another side of the piston opposite the LVDT.

In a further embodiment of any of the above, the probe includes a removable tip on a side opposite the piston. The tip is configured to engage the pin.

In a further embodiment of any of the above, an air port is provided in the body and is in fluid communication with an air source and the piston.

In a further embodiment of any of the above, a water jacket surrounds at least a portion of the body and is in fluid communication with a fluid cooling source.

In another exemplary embodiment, a weld gun assembly includes first and second electrode assemblies. The first electrode is configured to support a workpiece to which a fastener is welded. The weld gun assembly includes the first electrode assembly and includes a movable pin that is configured to support the fastener in a welding position. A second electrode assembly includes a body that supports an electrode that has an aperture. The aperture is configured to receive the movable pin. The second electrode assembly has a position sensor member that is arranged in the body and is configured to cooperate with the pin to detect a fastener welding characteristic.

In a further embodiment of the above, the first electrode assembly includes a lower electrode that has a surface that is configured to support the workpiece with the pin protruding through the workpiece.

In a further embodiment of any of the above, the pin is movable between multiple positions corresponding to the fastener welding characteristic. The position sensor member moves with the pin.

In a further embodiment of any of the above, a position sensor includes the position sensor member. The position sensor has a linear variable displacement transducer (LVDT).

In a further embodiment of any of the above, the body includes a bore. The position sensor includes a piston that is slidably received in the bore. The LVDT has an LVDT core that is secured to one side of the piston.

In a further embodiment of any of the above, the position sensor member includes a probe that is slidably received in the aperture and secured to another side of the piston opposite the LVDT.

In a further embodiment of any of the above, the probe includes a removable tip on a side opposite the piston. The tip is configured to engage the pin.

In a further embodiment of any of the above, an air port is provided in the body and is in fluid communication with an air source and the piston.

In a further embodiment of any of the above, a water jacket surrounds at least a portion of the body and is in fluid communication with a fluid cooling source.

In a further embodiment of any of the above, there is a position sensor which includes a position sensor member. The position sensor includes a position sensing element that is in communication with the position sensor member. The position sensing element is arranged outside the body.

In another exemplary embodiment, a method of detecting a fastener welding characteristic during welding which includes the steps of supporting a fastener with a movable pin at one electrode assembly, clamping the fastener to a workpiece with the one electrode assembly and another electrode assembly and engaging the movable pin with a position sensor member during the clamping step to detect a fastener welding characteristic.

In a further embodiment of the above, the clamping step includes receiving the movable pin within an electrode of the other electrode assembly.

In a further embodiment of any of the above, a position sensor includes the position sensor member and has a linear variable displacement transducer (LVDT). The engaging step includes axially displacing the LVDT.

In a further embodiment of any of the above, the position sensor member includes a probe that is operatively secured to the LVDT. The engaging step includes the probe that engages the movable pin.

BRIEF DESCRIPTION OF THE DRAWINGS

The disclosure can be further understood by reference to the following detailed description when considered in connection with the accompanying drawings wherein:

FIG. 2A is a perspective view of upper and lower electrode assemblies.

FIG. 2B is a bottom perspective view of the upper electrode assembly.

FIGS. 4-6 illustrate cross-sectional views of the upper and lower electrode assemblies with correct nut, upside down nut and welded nut positions, respectively.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
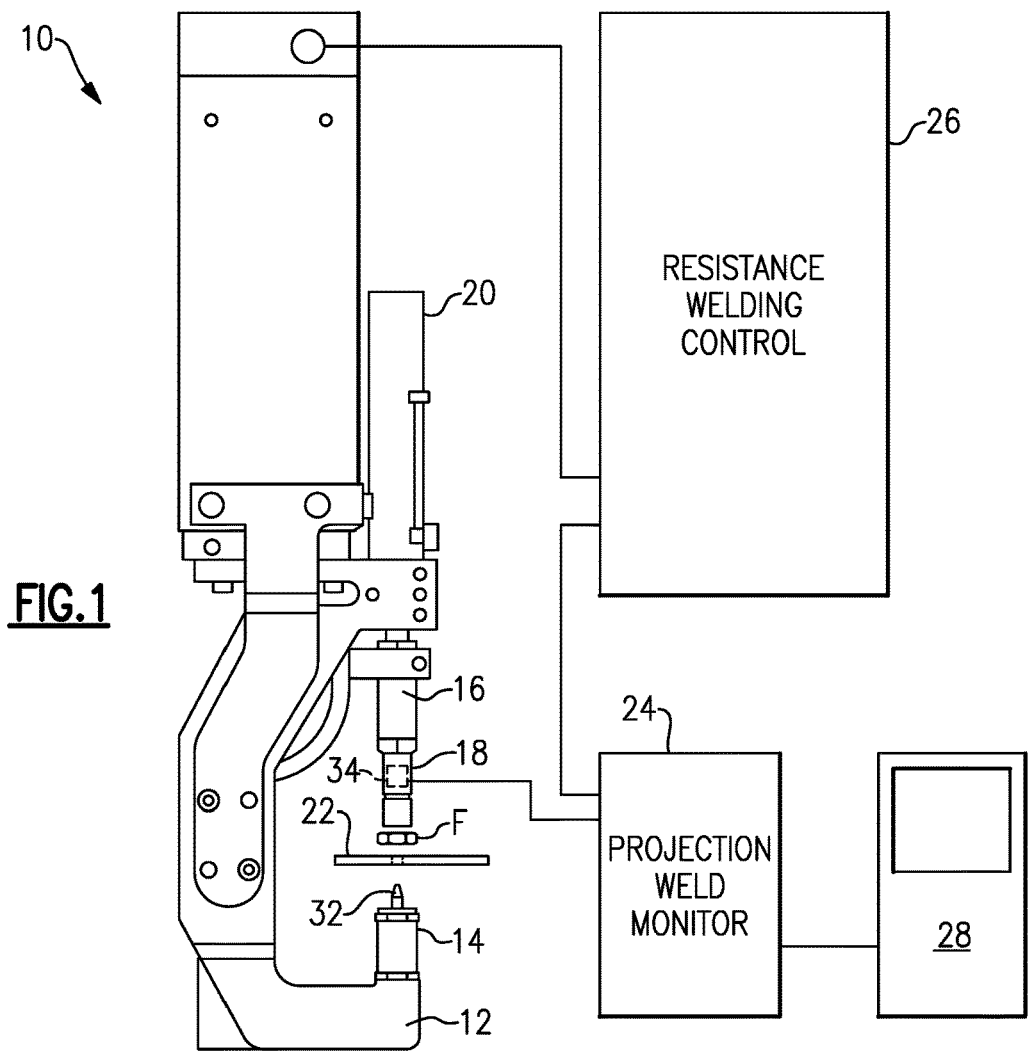
FIG. 1 is a schematic view of a weld gun assembly.

FIG. 1 is a highly schematic view of a weld gun assembly 10. The weld gun assembly 10 includes a lower stationary arm 12 supporting a lower electrode assembly 14. An upper movable arm 16 is connected to an actuator 20. The upper movable arm 16 includes an upper electrode assembly 18. The actuator 20 moves the upper movable arm 16 from an open position (shown) to a closed position in which the electrode assemblies 14, 18 are in engagement with an object 22 to be welded, such as a vehicle body panel. A fastener such as a weld stud or nut F is loaded onto one of the electrode assemblies 14, 18 and forced into engagement with the object 22.

The prior art has detected the presence and orientation of the fastener F within the weld gun assembly 10 by detecting the position of the upper arm 16, typically by utilizing an externally located displacement transducer such as an LVDT attached externally to one or both of the arms 12, 16. The disclosed arrangement utilizes a position sensor 34 in the upper electrode assembly 18 to detect the position and orientation of the fastener F by detecting a position of a pin 32, used to support the fastener F, in the lower electrode assembly 14. By determining the pin position, which is more accurate than prior art measuring techniques, better control of the weld operation can be achieved.

While the arms and electrodes are referred to in terms of "upper" and "lower", it is to be understood that the weld gun assembly 10 and its components may be oriented in a manner other than described and remain within the scope of this disclosure. The disclosed arrangement is applicable to welding any metal objects together and should not be interpreted as being limited to welding fasteners to metal sheets.

A projection weld monitor 24 is connected to the position sensor 34 to determine the position of the pin 32 throughout the welding operation. The data relating to the pin position may be manipulated to determine other useful information relating to the welding operation, as will be appreciated from the description below. The projection weld monitor 24 is connected to a resistance welding control 26, which is also connected to the weld gun assembly 10. The resistance welding control 26 commands the actuator 20 and the flow of current through the electrode assemblies 14, 18 in response to information from the projection weld monitor 24. A monitor programming interface 28 is connected to the projection weld monitor 24 for receiving an analog signal from the projection weld monitor 24 and providing data to a remote location, if desired. Operation of the weld gun assembly 10 is monitored and analyzed using monitor programming interface 28, which may include statistical analysis software.

Perspective views of the lower and upper electrode assemblies 14, 18 are shown in FIGS. 2A and 2B. The lower electrode assembly 14 includes an electrode 36 having a hole 33 thorough which the pin 32 extends. The pin 32 is axially moveable during the welding operation through multiple positions, examples of which are indicated as P0-P4 in FIG. 3. The upper electrode assembly 18 includes an electrode 40 having an aperture 37 through which a position sensor member, such as probe 60, of the position sensor 34 extends. It should be understood, however, that the probe 60 need not extend proud of the electrode 40, but may remain recessed within the electrode 40, if desired. Moreover, the position sensor 34 may be constructed from multiple components of which all or fewer than all may be located within the upper electrode assembly 18 (e.g. FIG. 7).

Figure 3:
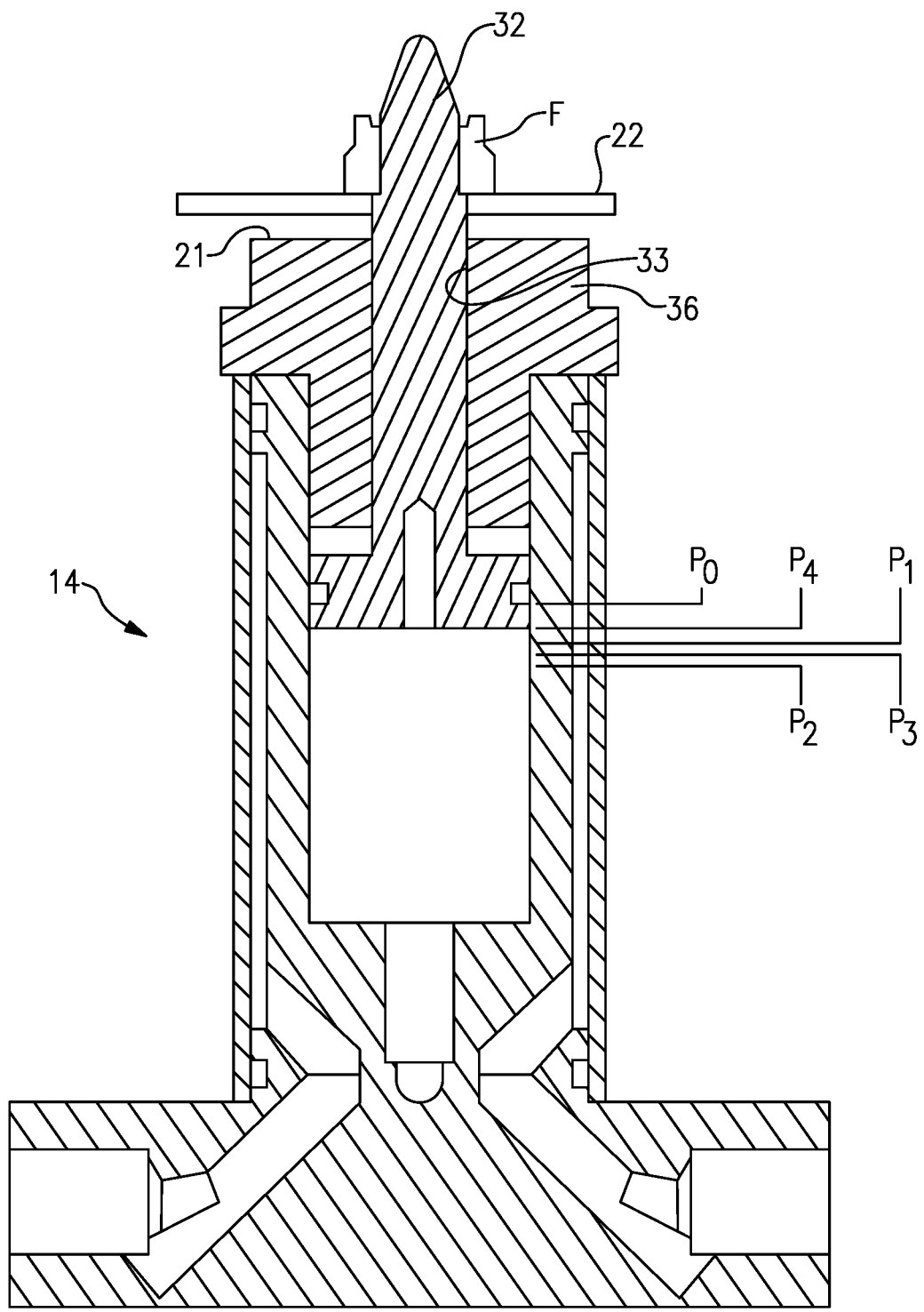
FIG. 3 is an enlarged cross-sectional view of the lower electrode assembly illustrating several pin positions.

According to FIG. 3, the pin 32 is shown supporting the fastener F with respect to the workpiece 22. Although shown spaced from the electrode 36, the workpiece 22 is supported on a surface 21 of the electrode 36 during welding.

The pin 32 moves axially within the hole 33 of the electrode 36 between multiple positions. In one example, position P0 corresponds to an initial position in which the pin 32 is fully extended. Position P1 corresponds to a position in which the upper and lower electrodes 40, 36 are clamped about the fastener F in the workpiece 22 prior to welding the fastener F to the workpiece 22. The position P1 corresponds to a properly loaded fastener, for example, a nut with its weld projections engaging the workpiece. Position P2 may correspond to an upside-down nut, which typically depresses the pin 32 further into the lower electrode assembly 14 than the position P1. Position P3 corresponds to a fastener height subsequent to welding, which provides a weld signature indicative of, for example, weld upset and set down. Position P4 corresponds to a partially returned pin 32 in which the pin 32 undesirably does not fully return to the initial position P0.

The above positions are exemplary only. Numerous fastener welding characteristics may be monitored and detected by sensing the weld fastener position via the pin 32 as set forth in, for example, U.S. Pat. No. 7,564,005, entitled "RESISTANCE WELDING FASTENER ELECTRODE AND MONITOR AND METHOD OF USING SAME," which is incorporated herein by reference in its entirety.

FIG. 4-6 schematically illustrate cross-sectional views of the upper and lower electrode assemblies 18, 14 with correct nut, upside-down nut and weld nut positions, respectively.

According to FIG. 4, the upper electrode assembly 18 includes an electrode holder or body 38 that supports the electrode 40. A water jacket 42 at least partially surrounds the body 38. The water jacket 42 includes inlet and outlet ports 44, 46 that are in fluid communication with a water source 51, which provides a cooling fluid to cool the upper electrode assembly 18 during welding operations.

The position sensor 34 includes a position sensing member, such as an linear variable displacement transducer (LVDT) coil 52 that is secured within the bore 48 by a retainer 56. One example LVDT position sensing member suitable for the disclosed application is available a miniature separate core LVDT from Macrosensors. The LVDT position sensing member provides an output at a much higher frequency (e.g., 2500-10,000 Hz) than typical welding frequency (e.g., 50-1000 Hz), which can be easily filtered. An LVDT core 54 is axially moveable relative to the LVDT coil 52, which provides an axial position signal for processing by the projection weld monitor 24.

In the example, a piston 58 is slidably received in and sealed relative to the bore 48. The body 38 includes a bore 48 having an air port 50 that is in fluid communication with an air source 49. The LVDT core 54 is secured to one side of the piston 58.

Position sensor 34 includes a probe 60 slidably received in the aperture 37 of the electrode 40. The probe 60 secured to another side of the piston 58 opposite of the LVDT. The air source 49 provides pressurized air to the bore 40 to bias the piston 58 toward the pin 32 and return the probe 60 to a fully extended position subsequent to a welding operation.

In one example, the probe 60 includes a removable tip 62 that is configured to engage the moveable pin 32. As the tip 62 wears from use, it may be removed from the probe 60 and replaced. In an example, the probe 60 and tip 62 are insulated relative to the electrode 40 to prevent an electrical current path during the welding operation. In the example, the probe 60 and tip 62 are constructed from a nonconductive material.

During welding operation the fastener F is supported on the pin 32 at the lower electrode assembly 14 with the pin 32 in the position P0. This may be desirable for welding systems that have automated placement of the fastener F since the pin 32 may need to be in the fully advanced position to receive the fastener F. An electrical signal from the LVDT can be used to verify that the probe 60 and tip 62 are also in the fully advanced positions.

One method to verify the advanced position of the pin 32 is to probe its position, before the fastener placement operation, using the upper electrode assembly 18. The upper electrode assembly 18 can be advanced to a known point in the actuator stroke where the tip 62 engages the pin 32. In some instances, the upper electrode assembly 18 can simply be advanced to the point it makes firm contact with the lower electrode assembly 14. Alternatively, a suitable fixed retract position for equipment employing a pneumatic actuator, or a programmed position of a servoelectric actuator could be employed. Once the tip 62 has engaged the pin 32 and the position of the pin 32 has been verified, the upper electrode assembly 18 can be returned to the home position to permit fastener F loading. In many instances, this probing operation could be embedded in the equipment cycle time.

The fastener F and the workpiece 22 are clamped between the electrodes 36, 40. This force causes the fastener F to press against the shoulder of the pin 32 so it is pushed into the fastener electrode 36 to a position P1. During clamping, the position sensor 34 cooperates with the pin 32 to detect a fastener welding characteristic. In the example, the tip 62 of the probe 60 engages an end of the pin 32, which displaced the LVDT core 54 via the piston 58. The backside of the piston 58 is pressurized by the air source 49 to continue to urge the probe 60 and tip 62 into engagement with the pin 32. Thus, the position sensor 34 and pin 32 move in unison with one another throughout the welding operation, which provides indirect sensing of the weld fastener position via the pin 32.

When the tip 62 contacts the pin 32, the tip 62 is urged to move to a position corresponding to P1 that can be determined from the LVDT signal output and verified against the desired or expected position.

If either the workpiece 22 or fastener F is missing or the wrong thickness, the resistance welding control can be made to stop and prevent the passage of electrical welding current. The same applies to a condition where more than one fastener has been installed so the tip 62 does not properly engage the pin 32.

There can be multiple acceptable values corresponding to established combinations of workpiece 22 and fastener F thickness. These can be used to verify the specific combination presented to the machine and may be used to select the appropriate welding parameters in the resistance welding control.

FIG. 5 shows the condition in which a fastener F is incorrectly loaded up-side-down onto the pin 32. When the electrode assemblies close the pin 32 the geometry of the fastener will frequently cause the pin to be driven to a position P2, which is further inside the electrode 36 than expected. Detection of this improper position can be used to prevent welding and to alert the equipment operator of the part placement error before the fastener F is damaged by the passage of the electrical welding current.

Referring to FIG. 6, the electrode 40 remains in contact with the fastener F and the electrode 36 remains in contact with the workpiece 22 throughout the resistance projection welding process.

Figure 7:
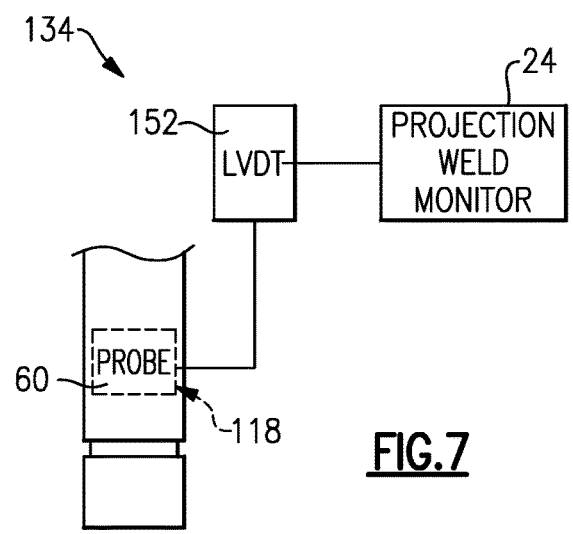
FIG. 7 illustrates another example upper electrode assembly.

The distance between the electrodes, and therefore the position of the probe assembly will change as the workpiece 22 and fastener F undergo thermal expansion due to the resistive heating and the projections become soft enough to collapse. The motion will cause a change in the position of probe 60, which can be used to create a signature of the weld. Thus, it should be understood the position sensor 134 may be configured such that only the probe 60 is arranged within the upper electrode assembly. The LVDT 152 may be positioned outside of the body of the upper electrode assembly 118, but still track the position of the probe, for example, as shown in FIG. 7. Moreover, it should be understood that a resistive, inductive or ultrasonic position sensing element may be used instead of an LVDT. Furthermore, a remote optical sensor may also be used to sense the position of the probe 60 using fiber optic cable.

Dynamic measurement of the tip 62 position can occur during welding if the LVDT is driven at a voltage and frequency which permit the filtering of the welding current signal.

At the completion of the welding process, after the height of the projections on the fastener has been reduced, the pin 32 will be pushed further to a position P3. The actual position can be compared with an expected value to determine if the fastener height is within acceptable range.

The tip 62 returns to its advanced position. The pin 32 has returned to a position P4 (FIG. 3) instead of being fully advanced to P0. This frequently occurs when the means provided within lower electrode assembly 14 to bias the pin 32 is insufficient to overcome the clamps in the fixturing or the mass of the weldment. When the weldment is removed the pin 32 should advance to P0.

It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An electrode assembly for welding fasteners, wherein the electrode assembly includes a body supporting an electrode having an aperture, the aperture is configured to receive a movable pin of another electrode assembly arranged opposite the electrode assembly, the other electrode assembly supports a fastener in a welding position, the electrode assembly comprising:
a position sensor including a position sensor member arranged in the body and configured to cooperate with the pin to detect a fastener welding characteristic.

2. The electrode assembly according to claim 1, wherein the position sensor has a linear variable displacement transducer (LVDT).

3. The electrode assembly according to claim 2, wherein the body includes a bore, and the position sensor includes a piston slidably received in the bore, the LVDT having a LVDT core secured to one side of the piston.

4. The electrode assembly according to claim 3, wherein the position sensor member includes a probe slidably received in the aperture and secured to another side of the piston opposite the LVDT.

5. The electrode assembly according to claim 4, wherein the probe includes a removable tip on a side opposite the piston, the tip configured to engage the pin.

6. The electrode assembly according to claim 3, comprising an air port provided in the body and in fluid communication with an air source and the piston.

7. The electrode assembly according to claim 1, comprising a water jacket surrounding at least a portion of the body and in fluid communication with a fluid cooling source.

8. A weld gun assembly including first and second electrode assemblies, the first electrode configured to support a workpiece to which a fastener is welded, the weld gun assembly comprising:
the first electrode assembly includes a movable pin configured to support the fastener in a welding position; and
a second electrode assembly includes a body supporting an electrode having an aperture, the aperture is configured to receive the movable pin, the second electrode assembly has a position sensor member arranged in the body and configured to cooperate with the pin to detect a fastener welding characteristic.

9. The weld gun assembly according to claim 8, wherein the first electrode assembly includes a lower electrode having a surface configured to support the workpiece, with the pin protruding through the workpiece.

10. The weld gun assembly according to claim 9, wherein the pin is movable between multiple positions corresponding to the fastener welding characteristic, the position sensor member moving with the pin.

11. The weld gun assembly according to claim 8, wherein a position sensor includes the position sensor member, the position sensor has a linear variable displacement transducer (LVDT).

12. The weld gun assembly according to claim 11, wherein the body includes a bore, and the position sensor includes a piston slidably received in the bore, the LVDT having an LVDT core secured to one side of the piston.

13. The weld gun assembly according to claim 12, wherein the position sensor member includes a probe slidably received in the aperture and secured to another side of the piston opposite the LVDT.

14. The weld gun assembly according to claim 13, wherein the probe includes a removable tip on a side opposite the piston, the tip configured to engage the pin.

15. The weld gun assembly according to claim 12, comprising an air port provided in the body and in fluid communication with an air source and the piston.

16. The weld gun assembly according to claim 8, comprising a water jacket surrounding at least a portion of the body and in fluid communication with a fluid cooling source.

17. The weld gun assembly according to claim 8, including a position sensor that includes a position sensor member, the position sensor includes a position sensing element in communication with the position sensor member, the position sensing element arranged outside the body.

18. A method of detecting a fastener welding characteristic during welding, the method comprising the steps of:
supporting a fastener with a movable pin at one electrode assembly;
clamping the fastener to a workpiece with the one electrode assembly and another electrode assembly, wherein a position sensor member is carried by the other electrode assembly; and
engaging the movable pin with the position sensor member during the clamping step to detect a fastener welding characteristic.

19. The method according to claim 18, wherein the clamping step includes receiving the movable pin within an electrode of the other electrode assembly.

20. The method according to claim 18, wherein a position sensor includes the position sensor member and has a linear variable displacement transducer (LVDT), and the engaging step includes axially displacing the LVDT.

21. The method according to claim 20, wherein the position sensor member includes a probe operatively secured to the LVDT, and the engaging step includes the probe engaging the movable pin.

* * * * *